United States Patent Office 2,723,279
Patented Nov. 8, 1955

2,723,279

ANTHRAQUINONE DYESTUFFS

Milton L. Hoefle, David I. Randall, and Edgar E. Renfrew, Easton, Pa., assignors to General Aniline & Film Corporation, New York, N. Y., a corporation of Delaware No Drawing. Application December 30, 1952,
Serial No. 328,818

6 Claims. (Cl. 260—377)

The present invention relates to the production of new dyestuffs of the anthraquinone series, and more particularly to unsulfonated compounds having the following general formula:

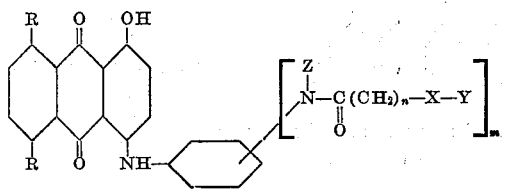

wherein one R stands for OH and the other R stands for $NO_2$, X is selected from the group consisting of O, S and NZ, Y is selected from the group consisting of hydrogen,

lower alkyl, hydroxyalkyl, alkoxyalkyl, hydroxyalkoxyalkyl, hydroxypolyalkoxyalkyl and cyanoalkyl, Z is selected from the group consisting of hydrogen, lower alkylfi hydroxyalkyl and cyanoalkyl, n is an integer having a value of 1 through 5, and m is an integer having a value of 1 through 3.

The need for a range of blue dyestuffs which are fast to light and to acid gas fumes when applied to cellulose acetate rayon has been long recognized. In the compounds of the formula described above, we have discovered a series of dyestuffs which combine the desirable properties of good substantivity and good light fastness, wash fastness and acid gas fastness. These dyestuffs may also be employed for coloring other polymeric material in bulk or fiber form, for example nylon, Dacron, Orlon, Acrilan, Dynel and the like.

The dyestuffs of this invention may be readily prepared by condensing the corresponding arylamino compound with a 1,8-dihydroxy-4,5-dinitro or 1,5-dihydroxy-4,8-dinitroanthanquinone. Catalysts and acid binding agents may be employed if desired, and the reaction may be carried out preferably in the absence of water and in an inert organic diluent.

It will be readily understood that the compounds of the instant invention may be substituted in the benzene nucleus of the 4-benzeneamino substituent and in the 2, 3, 6 and 7 positions of the anthraquinone nucleus by inert substituents which do not detract from the properties desired in the final dyestuff.

In the formula, in addition to the specific substituents mentioned above, Z may for example be methyl, ethyl, hydroxyethyl, hydroxymethyl, cyanomethyl, cyanoethyl or the like, and Y may for example, be methyl, ethyl, hydroxymethyl, hydroxyethyl, methoxyethyl, hydroxyethoxyethyl, hydroxypentaethoxyethyl, cyanomethyl, cyanoethyl or the like.

The following examples serve to illustrate the invention but are not intended to be limited thereto. Parts are by weight unless otherwise indicated.

*Example 1*

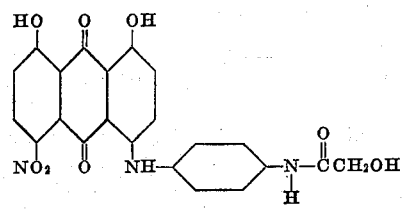

A reaction vessel equipped with a stirrer, thermometer and reflux condenser was charged with 6.6 parts 4,5-dinitrochrysazine, 7.2 parts p-aminoglycolanilide and 40 parts o-dichlorobenzene. The reaction mixture was heated at reflux for four hours, and at the end of this time it was steam distilled. The solid product was isolated by filtration, and it was then purified by suspending and warming at 90° for thirty minutes in 750 parts water containing 4 parts sodium carbonate and 4 parts sodium bicarbonate. The product was removed by filtration and suspended in 150 parts methanol which was then refluxed for thirty minutes. Upon cooling the product was isolated by filtration and dried. 8.5 parts of product were obtained which readily dyed acetate rayon in deep shades of blue possessing excellent gas and light fastness.

*Example 2*

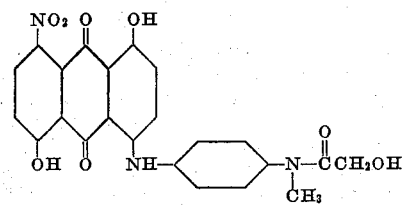

A reaction vessel equipped with a stirrer, thermometer and reflux condenser was charged with 6.6 parts 4,5 - dinitroanthrarufin, 7.5 parts p-amino-N-methylglycolanilide and 40 parts o-dichlorobenzene. The reaction mixture was heated at reflux for five hours. It was then steam distilled, and the product was isolated by filtration. This product was then purified in a manner similar to that in Example 1. The product dyed acetate rayon in deep blue shades of excellent light and gas fastness.

*Example 3*

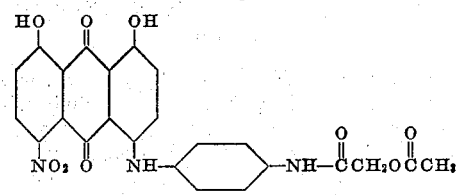

Into a reaction flask equipped with a stirrer, thermometer and reflex condenser was charged 6.6 parts 4,5-dinitrochrysazine, 7.9 parts p-aminoglycolanilide acetate [obtained by reduction of the product obtained by the action of anhydrous potassium acetate on p-nitro-α-chloroacetanilide in glacial acetic acid] and 45 parts nitrobenzene. This reaction mixture was heated at 170–180° C. for five hours. The reaction mixture was then steam distilled, and the product was removed by filtration. The product was purified by suspending in 150 parts refluxing methanol and stirring for twenty minutes. On cooling the product was removed by filtration and washed with 50 parts methanol. This product dyed acetate rayon in strong blue shades which possessed excellent light and gas fastness.

Example 4

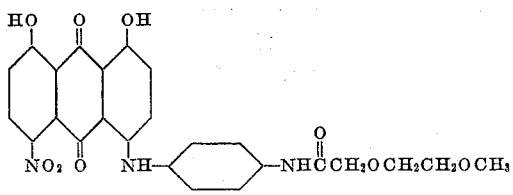

Into a reaction flask equipped with a stirrer, condenser and thermometer was charged 6.6 parts 4,5-dinitro chrysazine, 8.0 parts p-amino-α-2-methoxethoxyacetanilide [obtained by reducing the product from the condensation of sodium alcoholate of methyl cellosolve and p-nitro-α-chloroacetanilide] and 45 parts o-dichlorobenzene. This reaction mixture was heated at reflux for five hours and then steam distilled. The product was isolated by filtration and purified in a manner identical to that used in the preceding example. The product readily dyed acetate rayon in heavy blue shades which possessed exceptional light and gas fastness.

Example 5

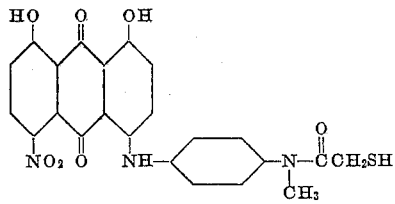

Into a reaction vessel equipped with stirrer, thermometer and condenser was charged 6.6 parts 4,5-dinitrochrysazine, 7.6 parts p-amino-α-mercapto-N-methylacetanilide (prepared by the chemical reduction of the condensation product of p-nitro-α-chloro-N-methylacetanilide and sodium hydrogen sulfide) and 45 parts o-dichlorobenzene. The reaction mixture was heated at reflux for five hours and then steam distilled. The product was isolated by filtration and purified as in the preceding example. This product dyes rayon acetate in blue shades possessing excellent gas and light fastness.

Example 6

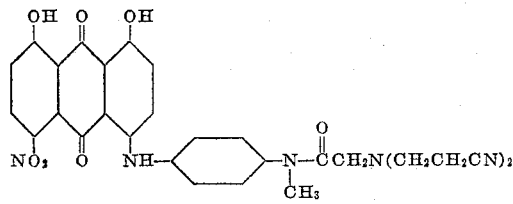

Into a reaction flask equipped with a stirrer, condenser and thermometer was charged 6.6 parts 4,5-dinitrochrysazine, 11.2 parts p-amino-α-bis(2-cyanoethyl)amino-N-methylacetanilide and 45 parts o-dichlorobenzene. The reaction mixture was heated at reflux for five hours and then steam distilled. The product was isolated by filtration and purified in a manner similar to that employed in the preceding example. The produce dyed acetate rayon in blue shades possessing excellent gas and light fastness.

Various modifications and variations of this invention will be obvious to a person skilled in the art and such variations and modifications are to be regarded as within the purview of this application and the spirit and scope of the appended claims.

We claim:
1. A compound of the formula

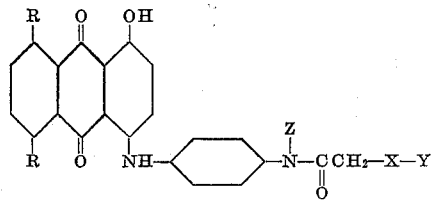

wherein one R stands for OH and the other R stands for $NO_2$; Z is selected from the group consisting of hydrogen and lower alkyl; X is selected from the group consisting of O, S and N; and Y is selected from the group consisting of hydrogen, acetyl, lower alkoxyalkyl and lower cyanoalkyl.

2. The compound of the formula

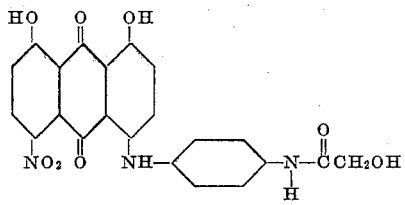

3. The compound of the formula

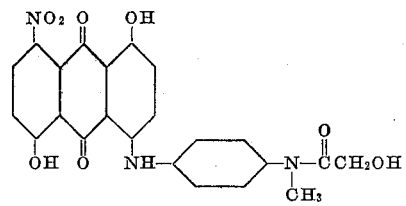

4. The compound of the formula

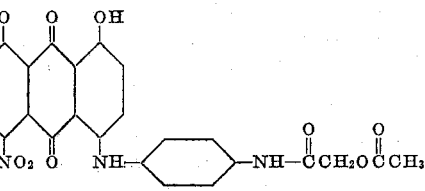

5. The compound of the formula

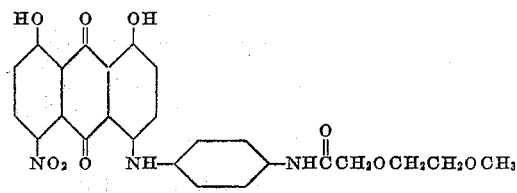

6. The compound of the formula

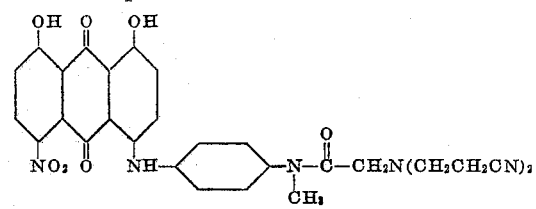

References Cited in the file of this patent
UNITED STATES PATENTS
2,245,780    Heinrich _____ June 17, 1941